Jan. 10, 1939.  W. OGILVIE  2,143,794
THREAD CUTTING DEVICE FOR LATHES
Filed June 8, 1937  5 Sheets-Sheet 1

INVENTOR
WILLIAM OGILVIE
BY Norris & Bateman
ATTORNEYS.

Jan. 10, 1939.  W. OGILVIE  2,143,794
THREAD CUTTING DEVICE FOR LATHES
Filed June 8, 1937  5 Sheets-Sheet 2
Fig. 1.ᵃ
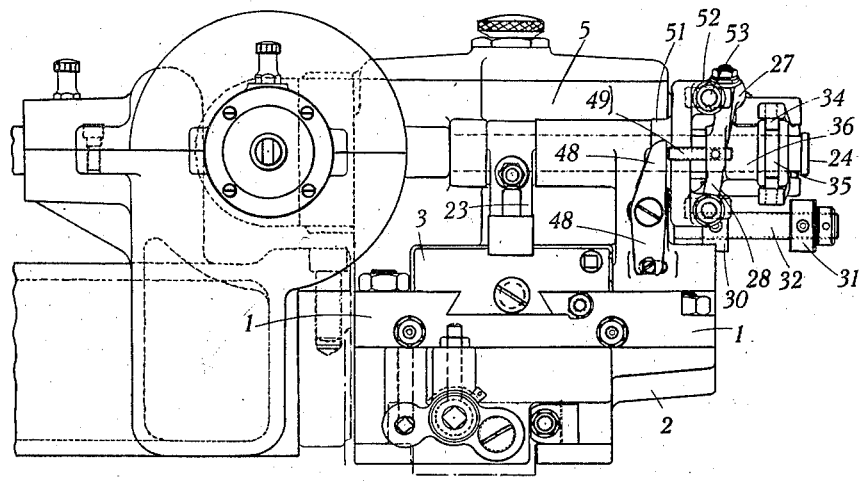
Fig. 2.ᵃ
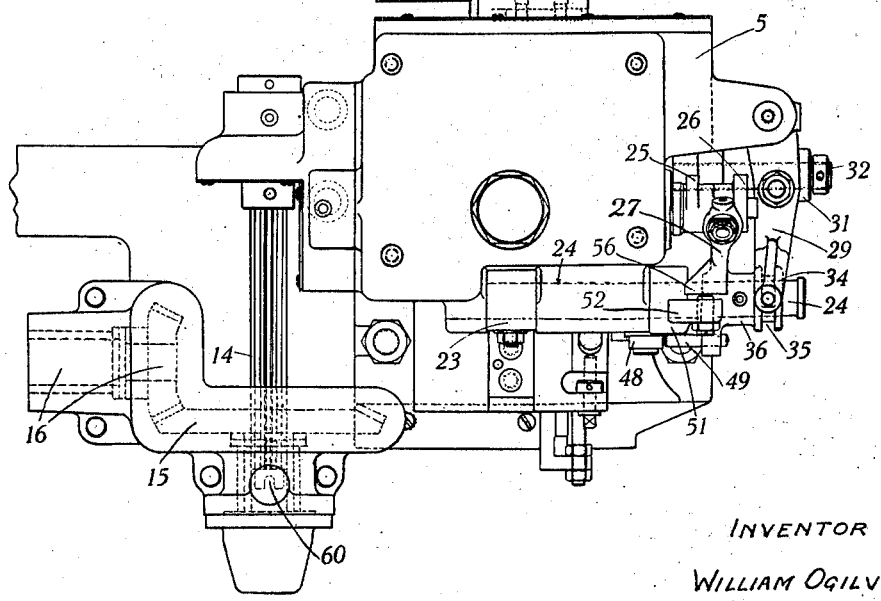
INVENTOR
WILLIAM OGILVIE
BY Norris & Bateman
ATTORNEYS.

Jan. 10, 1939.   W. OGILVIE   2,143,794
THREAD CUTTING DEVICE FOR LATHES
Filed June 8, 1937   5 Sheets-Sheet 3
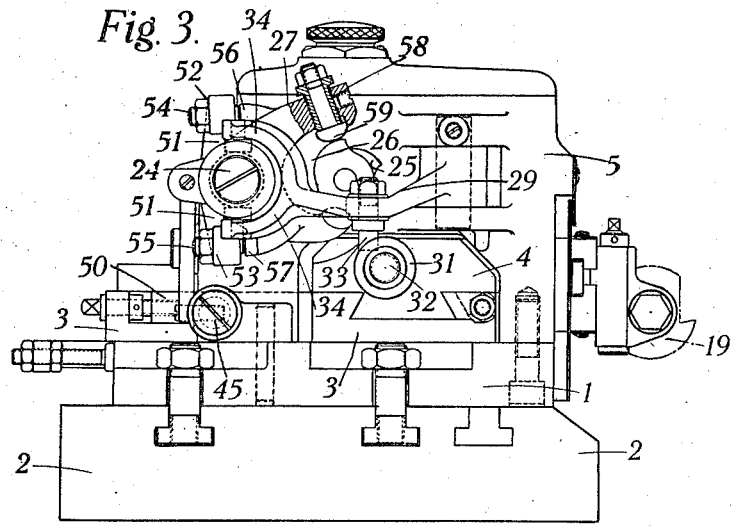
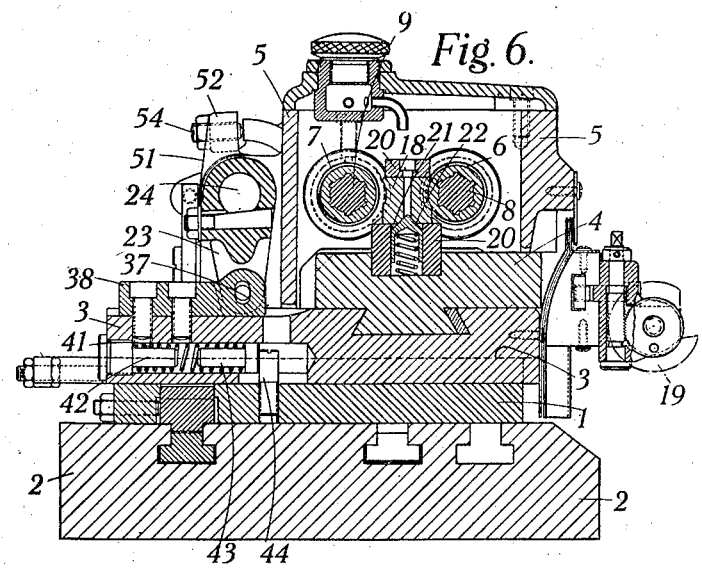
INVENTOR
WILLIAM OGILVIE
BY Norris & Bateman
ATTORNEYS.

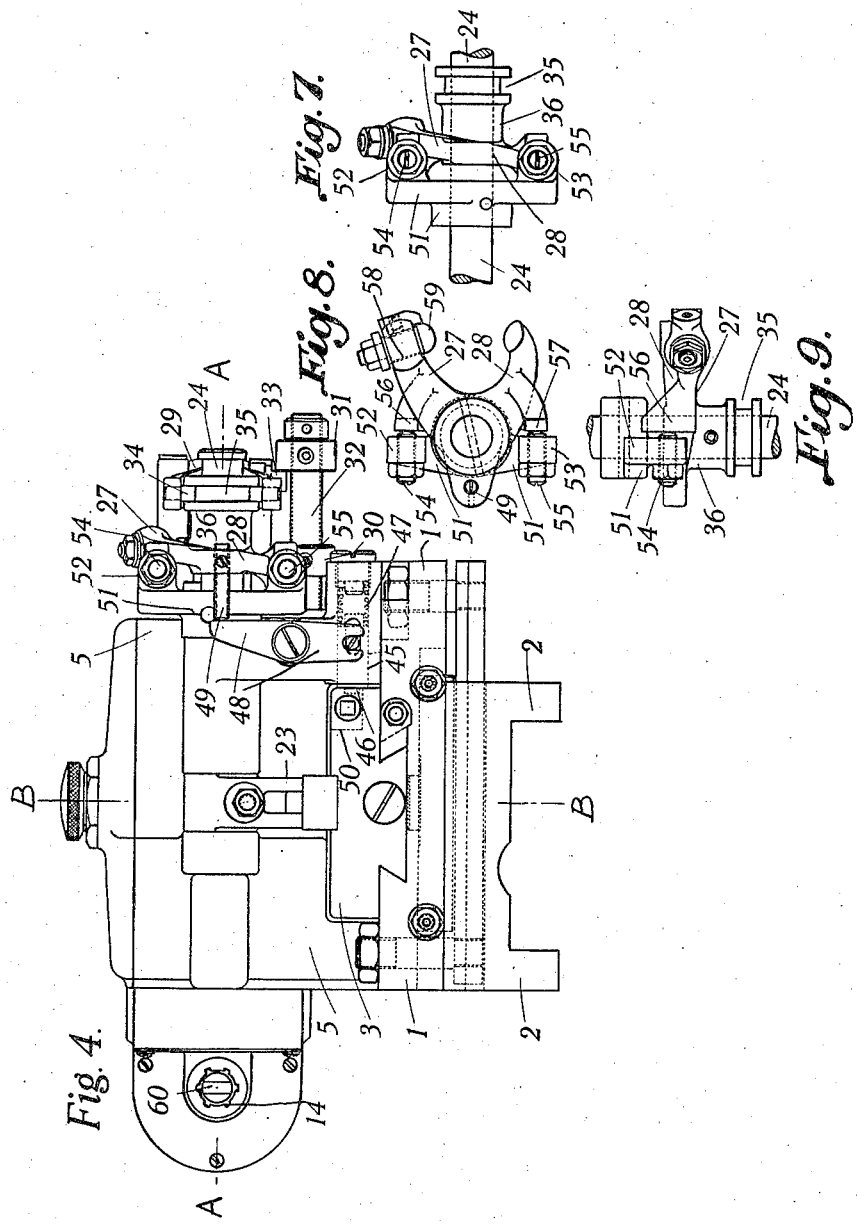

Patented Jan. 10, 1939

2,143,794

UNITED STATES PATENT OFFICE 2,143,794

THREAD CUTTING DEVICE FOR LATHES

William Ogilvie, Knowle, England, assignor to B. S. A. Tools Limited, Birmingham, England, a British company Application June 8, 1937, Serial No. 147,110
In Great Britain June 13, 1936

8 Claims. (Cl. 82—5)

This invention relates to thread cutting devices for use in single or multi-spindle lathes, and refers more particularly to the kind wherein a thread cutting tool is carried on a compound slide, operated by mechanism which is adapted to impart a longitudinal feed traverse to the cutter in the operation of thread cutting, retract the cutter from the work piece by a transverse movement of the slide, return same to the commencement of the feed traverse, and move the cutter into engagement with the work piece, when the operation as above can be automatically repeated any desired number of passes according to the depth of thread it is desired to cut.

In thread cutting devices of the aforesaid kind, it has been previously proposed to impart longitudinal feed traverse to the slides carrying the cutter by means of a rotatable but longitudinally confined lead screw, arranged to be engaged by a lead nut, in conjunction with means whereby said nut is disengaged from the lead screw on completion of the feed traverse, to permit of return movement of the slide, under the action of a spring or a weight.

The object of the invention is to provide an improved construction and arrangement of thread cutting mechanism adapted to constitute an attachment for use on single or multi-spindle lathes.

According to this invention the thread cutting device comprises a slide base preferably adapted for attachment to the machine and having mounted thereon a compound slide arranged to provide longitudinal and lateral movement of a cutter mounted on the upper member thereof, a housing attached to the slide base in which are mounted a pair of lead screws disposed in parallel relation and coupled by gear wheels which rotate said screws in opposite directions through driving mechanism which embodies a clutch, a lead nut mounted on the upper slide, and provided with segmental thread parts adapted for alternate engagement with the lead screws, means for imparting lateral movement to the compound slide whereby it is moved laterally to bring the lead nut into engagement with one of the lead screws arranged to impart a longitudinal feed traverse to the cutter, and out of engagement therewith at the end of the feed traverse into engagement with the other lead or return screw arranged to impart a longitudinal return movement to the upper slide, which brings the cutter to the commencement of its feed traverse, and means whereby the compound slide is moved laterally to bring the lead nut into engagement with the lead screw and the cutter into operative engagement with the work piece, when the operation, as above stated, may be repeated.

The invention also comprises means adapted to lock the laterally movable slide to prevent lateral movement of same when the cutter is in engagement with the work piece.

The invention further comprises features of construction and arrangement hereinafter described.

In order that the invention may be clearly understood and readily carried into practical effect, reference is made in the following description to the accompanying drawings, in which:—

Figures 1 and 1a show a front elevation of a machine provided with thread cutting mechanism constructed in accordance with this invention.

Figures 2 and 2a collectively are a plan view of said machine.

Figures 3 and 4 show respectively an end and a front elevation of the thread cutting mechanism, on an enlarged scale.

Figure 6 is a cross sectional view taken on line B—B, Figure 4.

Figures 7, 8 and 9 are front and side elevations and a plan view respectively of the cam actuated rocker lever mechanism.

Figure 1:
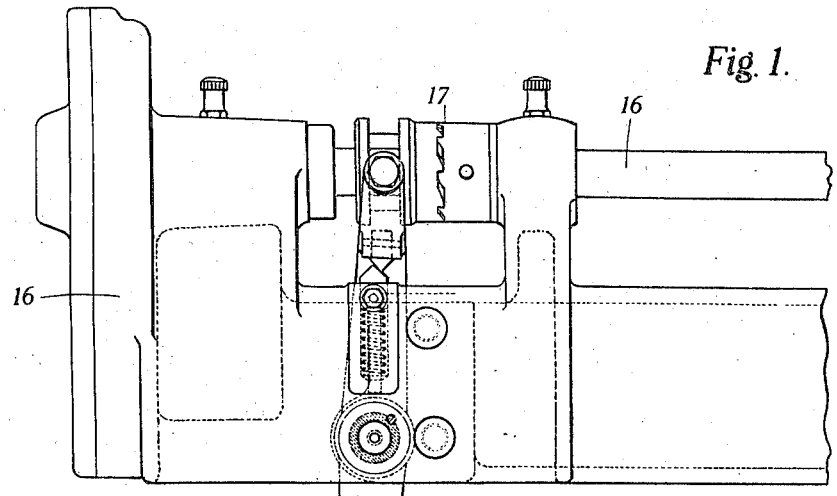

According to one convenient mode of carrying the invention into effect as illustrated, I provide a body which may be a slide base 1 adapted to be adjustably mounted on the machine or on a special slide 2 attached thereto, and on the said slide base 1 is mounted a laterally movable slide 3 on which is mounted a longiutdinally movable slide 4. On the slide base 1 is fixed a housing 5 in which are mounted two rotatable lead screws 6 and 7 disposed in parallel relation and carried in suitable bearings in the ends of said housing 5, in which latter the said lead screws are longitudinally confined. In order to permit of the ready substitution of lead screws of different pitch to suit the particular job as may be required, the lead screws in one convenient arrangement may be of cylindrical formation slidably attached to splined shafts 8 and 9.

Figure 2:
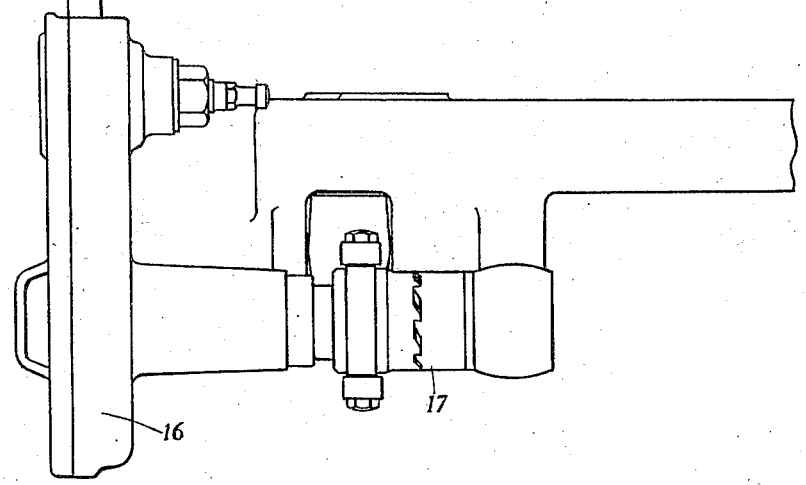

The shafts 8 and 9 of the lead screws 6 and 7 are connected by gear wheels 10 and 11 arranged to rotate the said screws in opposite directions, and on the outer end of the shaft 9 of one of the said screws is mounted a bevel pinion 12 engaging with a pinion 13 fixed on a transverse shaft 14 which is splined and adapted to slidably engage with a bevel pinion 15 of the driving mechanism 16, as seen in Figure 2, which may be of any known arrangement, and embodying a clutch device 17 adapted to be operated through a pivoted yoke piece actuated in known manner by lever and cam mechanism, whereby the thread cutting mechanism is made operative or inoperative in the sequence of operations on the work piece.

Figure 5:
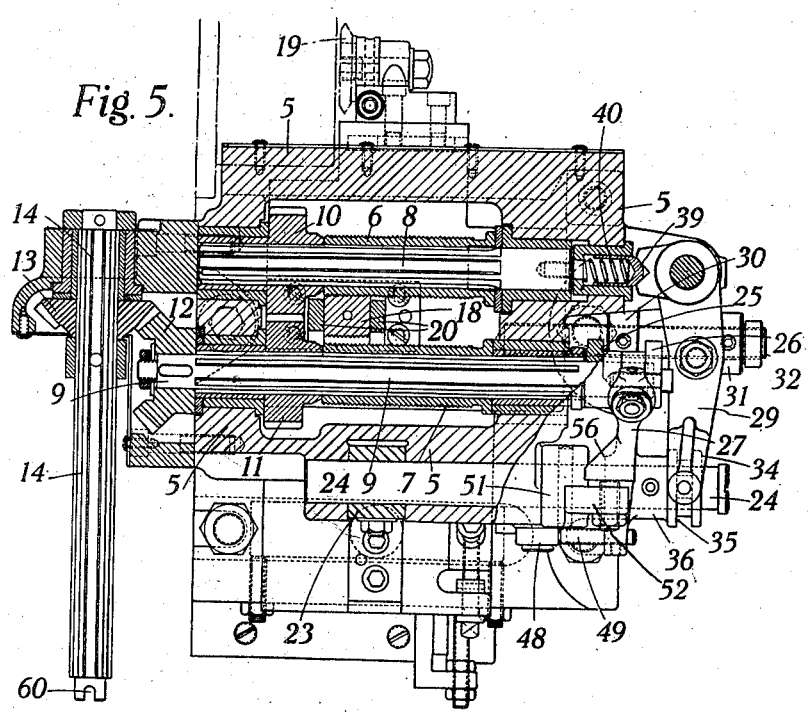
Figure 5 is a sectional plan view taken on line A—A, Figure 4.

On the upper slide 4 is mounted a lead nut 18 adapted for engagement with either of the lead screws 6 or 7 by lateral movement of the slides 3 and 4, so that when moved into engagement with the lead screw 6, as seen in Figures 5 and 6, a longitudinal feed traverse is imparted to the cutter 19, and when moved into engagement with the other lead or return screw 7, the cutter 19 will be returned to its initial position at the commencement of the feed traverse, ready to be moved inwards into engagement with the work piece, as hereinafter described.

The lead nut 18 comprises a rectangular block in opposite sides of which are formed segmental threads or half nuts for engagement with either the lead screw 6 or the return screw 7, in the lateral movement of the slides, the said block being mounted in a housing 20, fixed on the upper slide 4. In order to ensure and facilitate ready engagement of the lead nut 18 with either of the lead screws 6 or 7 it is preferably adapted to be held in a normal or central position under the action of a spring which is arranged to permit of a slight lateral movement in opposite directions so that when moved for engagement with either lead screw 6 or the return screw 7, if the tops of the threads on the nut 18 engage with the tops of the threads on the said screws, the nut is displaced slightly in a lateral direction. In one convenient arrangement, as seen in Figure 6, such can be effected by a spring loaded plunger 21 mounted in the lower part of the lead nut housing 20, the said plunger 21 having a V-shaped or conical nose part arranged to engage with a V-shaped or conical recess 22 in the underside of the lead nut 18.

The lateral or transverse movement of the slides 3 and 4 which retracts the cutter 19 from engagement with the work piece at the end of the feed traverse and moves the lead nut 18 from engagement with the lead screw 6 and into engagement with the return screw 7, is effected by means of a rocker lever or crank 23 carried on a rocker shaft 24 which is actuated by cams 25 and 26 mounted on the outer end of the rotating shaft 9 of the return screw 7, through cam levers 27 and 28 slidably carried on the rocker shaft 24 and adapted to be moved for engagement with either one of the cams 25, 26 by means of an actuating lever 29 pivotally mounted on the fixed housing 5 and arranged to be engaged by adjustable collars or abutments 30, 31 on a trip rod 32 mounted on the longitudinally movable slide 4, the said trip mechanism being so arranged that when the slide 4 nears the end of its longitudinal feed traverse the collar 31 on the trip rod 32 engages with a pin or projection 33 on the actuating lever 29, as seen in Figure 4, and imparts movement to the said lever, which has formed on its outer end a forked part 34 arranged to engage with a circumferential groove 35 in a sleeve part 36 on which are formed the longitudinally slidable cam levers 27, 28, whereby the said cam levers are alternately moved into and out of alignment with their respective cams 25, 26 on the shaft of the rotating return screw 7, and motion is thus imparted to the rocker shaft 24 through the rocker lever 23, which as seen in Figure 6, is provided at its lower end with a hinge pin 37 engaging with a slot in a hinge plate or bracket 38 fixed to the laterally movable slide 3 carrying the longitudinally movable slide 4, whereby a lateral movement is imparted to the said slides 3 and 4, and the cutter 19 is withdrawn from engagement with the work piece. In said lateral movement of the slides 3 and 4 the lead nut 18 is brought into engagement with the return screw 7, and the slides 3 and 4 are then moved or returned by said screw 7 to the commencement of the feed traverse. In order to provide a comparatively quick return movement of the slides 3 and 4 in relation to the feed traverse, the lead or return screw 7 and its associated screw thread on the lead nut 18, may have two or more starts, thus providing a comparatively steep pitch of the screw thread. In the aforesaid longitudinal return movement of the slides 3 and 4, the second collar 30 on the trip rod 32 mounted on the longitudinally movable slide 4 engages with the trip pin or projection 33 on the actuating lever 29, which latter is then caused to impart longitudinal sliding movement to the sleeve 36 carrying the cam levers 27, 28 on the shaft of the return screw 7, and motion is then imparted to the rocker shaft 24 whereby through the rocker lever 23 the slides 3 and 4 are moved laterally bringing the lead nut 18 into engagement with the lead screw 6, and the cutter 19 into operative contact with the work piece for the commencement of the next feed traverse.

In order to ensure that the cam levers 27 and 28 normally assume a position intermediate of the cams 25 and 26, on the shaft of the rotating return screw 7, there is formed on the actuating lever 29, near its pivot centre, a V-shaped notch or gap 39 adapted to be engaged by a spring loaded plunger 40 mounted in a socket or the like fitted in the side of the housing 5.

In a recess in the laterally movable slide 3, as seen in Figure 6, may be mounted a spring 41 supported between an outer attachment pin or register 42 and an inner end pad or register 43 which abuts against a peg 44 mounted in the slide base 1, the said spring 41 being adapted to hold the slide 3 in the outward position when the cutter 19 is retracted from engagement with the work piece, and to serve as a buffer in the inward movement of the cutter 19 into contact with the work piece.

In order to prevent lateral movement of the laterally movable slide 3 when the cutter 19 is in cutting engagement with the work piece, in the housing 5, as seen in Figures 3 and 4, is slidably mounted a slidable locking pin 45 which moves into engagement with a notch 46 in the said slide 3 by means of a spring 47, the said locking pin 45 being arranged to be moved out of engagement when the cutter reaches the end of its feed traverse by means of a pivoted lever 48 mounted on the side of the housing 5, and arranged to be engaged by a peg 49 adjustably mounted on the sleeve part 36 of the longitudinally slidable cam levers 27, 28 carried on the rocker shaft 24. The aforesaid notch 46 with which the locking pin 45 is adapted to engage is preferably formed in a block or member 50 adjustably mounted on the laterally movable slide 3.

In order to vary the extent of lateral movement of the slide 3 when withdrawing the lead nut 18 from engagement with the lead screw 6 and moving same into engagement with the lead or return screw 7, to accommodate the use of lead screws of varying pitch, in which screws of a large pitch and consequently greater depth necessitate a greater lateral movement of the lead nut 18 to engage or disengage same from the said lead screws, I provide means for adjustment of the cam levers 27, 28 in their contact with the periphery of the cams 25, 26. In one convenient arrangement, as seen in Figures 3 and 4, and in the detailed views, Figures 7, 8 and 9, the aforesaid adjustment is effected by rotatably mounting the sleeve part 36 of the cam levers 27, 28 on the rocker shaft 24, and by fixing rigidly on the latter a sleeve part 51 provided with lugs 52, 53 in which are mounted adjusting screws 54, 55 arranged to contact with lugs 56, 57 formed on the cam levers 27, 28 which provide for angular adjustment of the latter in relation to the aforesaid fixed member or sleeve part 51. Further, in the cam lever 27, as seen in Figures 3 and 7, 8 and 9, may be mounted an adjustable sleeve 58 carrying a headed stud 59 adapted to constitute a cam skid. The aforesaid arrangements are adapted to adjust and control the contact of the cam lever 27 with the periphery of the cam 26, whereby the extent of angular movement of the cam lever 27 and consequently that of the rocker shaft 24 is adjusted or controlled.

Means are also provided for turning the mechanism by hand to facilitate setting up, comprising a handle arranged to engage with a notch 60 in the end of the transverse splined shaft 14 which slidably engages with the bevel pinion 15 of the driving mechanism.

I claim:—

1. A thread cutting device of the kind herein referred to, comprising a base, a slide mounted on the aforesaid base for lateral movement, a slide carried by said slide movable laterally therewith and having a movement longitudinally relatively thereto, a cutter mounted on one of said slides, a housing on the said base, a pair of lead screws journalled on the housing and disposed in parallel relation, gearing to rotate said lead screws in opposite directions, a lead nut mounted on the longitudinally movable slide, said lead nut being adapted for alternate engagement with the lead screws, and means to operate the laterally movable slide to place the lead nut alternately into and out of engagement with the lead screws for imparting a longitudinal feed traverse and a return movement to the cutter.

2. A thread cutting device of the kind herein referred to, comprising a base, a slide mounted on the aforesaid base for lateral movement, a slide carried by said slide movable laterally therewith and having a movement longitudinally relatively thereto, a cutter mounted on one of said slides, a housing on the said base, a pair of lead screws journalled on the housing and disposed in parallel relation, gearing to rotate said lead screws in opposite directions, a lead nut mounted on the longitudinally movable slide, said lead nut being adapted for alternate engagement with the lead screws, and means to operate the laterally movable slide to place the lead nut alternately into and out of engagement with the lead screws for imparting a longitudinal feed traverse and a return movement to the cutter, comprising a rocker shaft carried on the housing, an arm on said rocker shaft connected to the laterally movable slide, a pair of cams mounted on one of the lead screws, a pair of cam members, means slidably mounted on said rocker shaft carrying said cam members and adapted for alternate engagement with said cams, means whereby the said cam members will assume a position clear of the cams during the main part of the feed traverse of the longitudinally movable slide, the said means also serving to move one of the cam members into engagement with its associated cam when the cutter nears the end of its feed traverse, while the other cam member is movable into engagement with its associated cam when the cutter is near the end of the return movement, whereby the lead nut is alternately moved into and out of engagement with the lead screws.

3. A thread cutting device for lathes, as claimed in claim 2, wherein the means slidably mounted on the rocker shaft and carrying said cam members is a sleeve, an actuating lever pivoted on the housing and engageable with said sleeve, a trip rod mounted on the longitudinally movable slide, abutments on the said trip rod adapted to alternately engage with the said actuating lever when the second mentioned slide nears the end of its aforesaid feed traverse or return movement.

4. A thread cutting device for lathes, as claimed in claim 2, wherein the means slidably mounted on the rocker shaft and carrying said cam members is a sleeve, an actuating lever pivoted on the housing and engageable with said sleeve, a trip rod mounted on the longitudinally movable slide, abutments on the said trip rod adapted to alternately engage with the said actuating lever when the second mentioned slide nears the end of its aforesaid feed traverse or return movement, means urging the cam members to a position clear of engagement with their associated cams during the main part of the longitudinal traverse of the cutter comprising a spring loaded plunger device, and the actuating lever having a notch engaged by said plunger device.

5. In a thread cutting device for lathes, as claimed in claim 1, means operable to secure the laterally movable slide against lateral movement when the cutter is in engagement with work, comprising a spring loaded bolt slidably mounted on the base, a lever pivoted on the housing and engaging said bolt, said lever being engageable by the sleeve at the end of the feed traverse of the cutter to release said bolt.

6. In a thread cutting device for lathes, as claimed in claim 2, said cam members being cam levers, means for angular adjustment of the cam levers in relation to their associated cams for controlling the lateral movement of the lead nut in relation to the lead screws, the means slidably mounted on the rocker shaft being a sleeve, lugs on the cam levers, a bracket on said rocker shaft, and adjusting screws on said bracket arranged to engage said lugs.

7. In a thread cutting device for lathes, as claimed in claim 2, said cam members being cam levers, means for angular adjustment of the cam levers in relation to their associated cams for controlling the lateral movement of the lead nut in relation to the lead screws, the means slidably mounted on the rocker shaft being a sleeve, lugs on the cam levers, a bracket on said rocker shaft, and adjusting screws on said bracket arranged to engage said lugs, and an adjustable skid, mounted on one of the cam levers and adapted to contact with the periphery of the associated cam.

8. A machine of the kind herein referred to having a feed screw device and a return screw device in parallelism, means to drive the screw devices in opposite directions, a body mounting said screw devices, a slide movable laterally relatively to said body, a slide carried by the first slide having a movement longitudinally relatively to said body and first slide, a cutter controlled by the slides, a lead nut member located between the screw devices and carried by the second slide, a lever pivoted on said body, a trip rod on the second slide having abutments to engage and swing said lever, cams rotatable with one of said screw devices, a rock-shaft on the body, a sleeve on said rock-shaft interconnected with said lever, cam devices on said sleeve movable therewith into alignment with said cams, respectively, at opposite extremes of movement of the sleeve to rock said rock-shaft, and means operable to move the slides laterally from the rock-shaft at one extreme of movement of the first slide to shift the lead nut member from operative relation with one screw device into operativer elation to the other screw device.

W. OGILVIE.